US 6,647,158 B2

(12) United States Patent
Betts et al.

(10) Patent No.: US 6,647,158 B2
(45) Date of Patent: Nov. 11, 2003

(54) OPTICAL MODULATOR USING SIMULTANEOUS PUSH-PULL DRIVE OF LINEAR AND QUADRATIC ELECTRO-OPTIC EFFECTS

(75) Inventors: Gary E. Betts, Westford, MA (US); Joseph P. Donnelly, Carlisle, MA (US); Patrick J. Taylor, Woburn, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 212 days.

(21) Appl. No.: 09/952,377

(22) Filed: Sep. 13, 2001

(65) Prior Publication Data

US 2002/0071622 A1 Jun. 13, 2002

Related U.S. Application Data

(60) Provisional application No. 60/232,914, filed on Sep. 15, 2000.

(51) Int. Cl.[7] .............................................. G02F 1/035
(52) U.S. Cl. ........................................................ 385/2
(58) Field of Search ............................................ 385/2

(56) References Cited

FOREIGN PATENT DOCUMENTS

EP          0 881 526 A2    12/1998

OTHER PUBLICATIONS

Dorren, B.H.P., et al., "Electrorefraction in strained InGaAs/InP chopped quantum wells: Significance of the interface layers", *Journal of Applied Physics*, 87(5): 2331–2335 (2000).

Pamulapati, J., et al., "Refractive index and electro–optic effect in compressive and tensile strained quantum wells", *Journal of Applied Physics*, 69(7): 4071–4074 (1991).

Fetterman, M., et al., "Fabrication and Analysis of High–Contrast InGaAsP–InP Mach–Zehnder Modulators for Use at 1.55–$\mu$m Wavelength", *IEEE Photonics Technology Letters*, 8(1): 69–71 (1996).

Spickermann, R., et al., "A Polarization Independent GaAs–AlGaAs Electrooptic Modulator", *IEEE Journal of Quantum Electronics*, 32 (5): 764–769 (1996).

Sakamoto, S.R., et al., "Substrate Removed GaAs–AlGaAs Electrooptic Modulators", *IEEE Photonics Technology Letters*, 11(10): 1244–1246 (1999).

Khan, M.N. et al., "A Novel High–Speed and Wavelength Insensitive Y–Branch Modulator with Reduced and Controllable Chirp", *IEEE Photonics Technology Letters*, 11(10): 1247–1249 (1999).

Heaton, J.M., et al. "Invited Paper MMIC compatible GaAs/AlGaAs electro–optic waveguide modulators and switches for microwave applications", *International Journal of Optoelectronics*, 10(6): 479–488 (1995).

(List continued on next page.)

*Primary Examiner*—Javaid H. Nasri
(74) *Attorney, Agent, or Firm*—Hamilton, Brook, Smith & Reynolds, P.C.

(57) ABSTRACT

An electro-optic push-pull modulator requiring reduced high switching voltages through combinations of device structure and operation, causing linear and quadratic electro-optic effects to add. Such combinations of device structure and operation include combinations of crystal axis orientation, waveguide structure, electrode structure, electric field biasing, operating wavelengths, and optical polarizations. By inducing linear and quadratic electro-optic effects to add, significant refractive index changes can be realized with lower switching voltages, V$\pi$. Furthermore, significant reduction in switching voltage for push-pull modulators can also be realized through combinations of device structure and operation effectively inducing solely the quadratic electro-optic effect.

22 Claims, 7 Drawing Sheets

OTHER PUBLICATIONS

Khan, M.N., et al., "Design and Demonstration of Weighted–Coupling Digital Y–Branch Optical Switches in InGaAs/InGaAlAs Electron Transfer Waveguides", *Journal of Lightwave Technology*, 12(11): 2032–2039 (1994).

Zucker, J.E., et al., "Miniature Mach–Zehnder InGaAsP Quantum Well Waveguide Interferometers for 1.3 $\mu$m", *IEEE Photonics Technology Letters*, 2(1): 32–34 (1990).

Jiang, Q., et al., "A Subcarrier–Multiplexed Coherent FSK System Using a Mach–Zehnder Modulator with Automatic Bias Control", *IEEE Photonics Technology Letters*, 5(8): 941–943 (1993).

Lawetz, C., et al, "Modulation Characteristics of Semiconductor Mach–Zehnder Optical Modulators", *Journal of Lightwave Technology*, 15(4): 697–703 (1997).

Rolland, C., et al., "10 Gbit/s, 1.56$\mu$m MultiQuantum Well InP/InGaAsP Mach–Zehnder Optical Modulator", *Electronic Letters*, 29(5): 471–472 (1993).

Leclerc, O., et al., "40 Gbit/s polarisation–insensitive and wavelength–independent InP Mach–Zehnder modulator for all–optical regeneration", *Electronics Letters*, 35(9): 730–731 (1999).

Zucker, J.E., et al., "Quantum Well Interferometric Modulator Monolithically Integrated With 1.55$\mu$m Tunable Distributed Bragg Reflector Laser", *Electronic Letters*, 28(20): 1888–1889, (1992).

Delansay, Ph., D., et al., "InP/GaInAsP phase–shifted Mach–Zehnder modulator for wavelength–independent (1530–1560 nm) performance in 10 Gbit/s transmission over dispersive fiber", *Conference on Optical Fiber Communications*, pp. 11–12.

Flanigan, B.J., et al., "The Push–Pull Principle", SPIE 2684: 72–82 No date given.

Leijtens, X., et al., "2X2 Mach–Zehnder interferometric switch based on hetero–n–i–p–i quantum wells", *Appl. Phys. Lett.,*, 66(20) 2736–2738 (1995).

Leclerc, O., et al., "Polarisation–independent InP push–pull Mach–Zehnder modulator for 20Gbit/s soliton regeneration", *Electronics Letters*, 34(10): 1011–1013 (1998).

OPTICAL MODULATOR USING SIMULTANEOUS PUSH-PULL DRIVE OF LINEAR AND QUADRATIC ELECTRO-OPTIC EFFECTS

RELATED APPLICATION

This application claims the benefit of U.S. Provisional Application No. 60/232,914, filed on Sep. 15, 2000. The entire teachings of the above application are incorporated herein by reference.

GOVERNMENT SUPPORT

The invention was supported, in whole or in part, by a grant F19628-95-C-0002 from United States Air Force. The Government has certain rights in the invention.

BACKGROUND OF THE INVENTION

Electro-optic modulators are used in fiberoptic communication systems, in particular, commercial high speed, long distance digital communication systems. Electro-optic modulators convert electrical signals representing data or voice into modulated optical signals, suitable for transmission over optical media.

Techniques for modulating optical signals include amplitude modulation and phase modulation. Amplitude modulation involves modulating optical signals, such that the light emitted from an electro-optic modulator is switched between "ON" and "OFF" states. A Mach-Zehnder interferometer is one example of a push-pull modulator that can be used to implement amplitude modulation. On the other hand, phase modulation results in the phase of optical signals being shifted a certain number of degrees. Phase modulated signals require specialized wave detectors to detect changes in phase, while amplitude modulated signals require photon detectors that detect light intensity.

One limiting factor of electro-optic modulators is the high switching voltages required for data transmissions at 10 gigabits per second (Gbit/s) and above. For push-pull modulators, the switching voltage, $V\pi$, is the voltage swing required to modulate light between "ON" and "OFF" states. Existing electrode designs require compromises among velocity, electrical/optical overlap (a measure of modulation efficiency), impedance, microwave loss, and manufacturability.

SUMMARY OF THE INVENTION

The present invention relates to an electro-optic push-pull modulator with reduced switching voltages. A reduction in switching voltage is realized through a combination of device structure and operation to cause addition of the so-called linear and quadratic electro-optic effects that result in refractive index changes in response to applied electric fields. The device structure may specify crystal axis orientation, waveguide structure, or electrode structure; the device operation may specify electric field biasing, operating wavelengths, or optical polarization. By inducing the linear and quadratic electro-optic effects to add, significant refractive index changes can be realized with a lower switching voltage, $V\pi$.

In particular, one preferred embodiment of the invention includes a substrate, an optical waveguide structure with electro-optic properties, and an electrode structure. In a III-V semiconductor material operation at a wavelength near the absorption edge (i.e., with photons having energy near but just below the band gap energy) causes the material to exhibit refractive index changes that vary quadratically in response to electrical fields applied substantially perpendicular to it (i.e., quadratic electro-optic effect). This effect occurs in the bulk material, but it can be strengthened by using a multiple quantum well (MQW) structure in the waveguide. Furthermore, the waveguide exhibits refractive index changes that vary linearly in response to applied electrical fields (i.e., linear electro-optic effect). The linear response is determined by the crystal axis orientation of the electro-optic material and the optical polarization of propagating optical signals.

The optical waveguide branches into a first waveguide arm and a second waveguide arm. Optical signals propagate through the waveguide, splitting into the waveguide arms where they are independently modulated by varying electrical fields applied by an electrode structure.

The electrode structure is disposed about the substrate applying electrical fields to each waveguide arm, substantially perpendicular to the MQW structure. Controlled by a modulation voltage, the electrical fields induce approximately equal and opposite refractive index changes in the waveguide arms, driving push-pull modulation of the optical signals. The electrode structure also biases the electrical fields about an electrical field having a non-zero magnitude and a direction, such that the linearly-varying and quadratically-varying refractive index changes add together while still retaining push-pull operation. The modulator performance may also be enhanced by proper selection of operating wavelength of the optical signals to induce a voltage-dependent optical absorption due to the Quantum-Confined Stark Effect (QCSE), but long enough to minimize optical losses. Thus, lower switching voltages may be applied to the electrode structure inducing equal and opposite refractive index changes in the waveguide arms for push-pull operation.

Further embodiments of the invention reduce switching voltages of electro-optic push-pull modulators through combinations of device structure and operation effectively inducing refractive index changes due solely to the quadratic electro-optic effect. This invention is applicable to any push-pull modulator that uses a waveguide structure that exhibits the quadratic electro-optic effect or a combination of quadratic and linear electro-optic effects. Although the detailed description of the preferred embodiment is specific to using III-V semiconductor material for waveguide and substrate, the general principles taught here can be applied to modulators built in different materials or combinations of materials. Furthermore, this invention is applicable to a polarization independent modulator with each polarization considered separately using the principles illustrated herein.

Figure 1A:
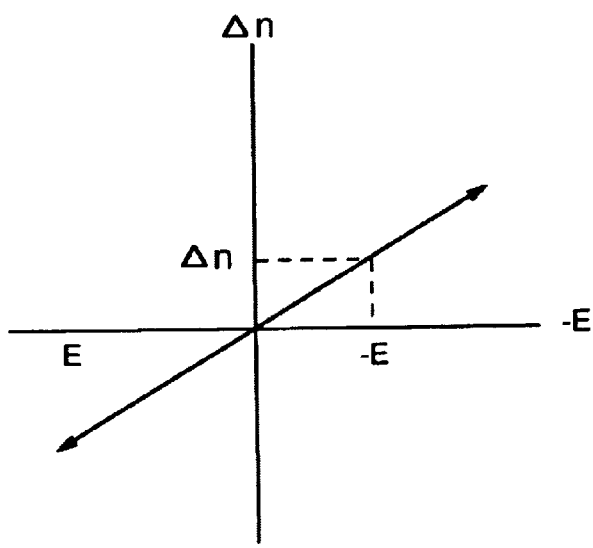
FIG. 1A and FIG. 1B are graphs illustrating linear electro-optic effects for different crystal axes of an electro-optic substrate.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Electro-optic materials, such as III-V semiconductors, are known to have various orders of electro-optic effects, including both linear and quadratic electro-optic effects. Such effects result in a change in the refractive index of electro-optic materials in response to applications of electric fields, varying in magnitude and direction. The refractive index of an electro-optic material is a coefficient characterizing the deflection of light at the boundary between two mediums with different refractive indices. By altering the refractive index of an electro-optic material, an optical signal propagating through the material will be phase modulated.

Figure 1B:
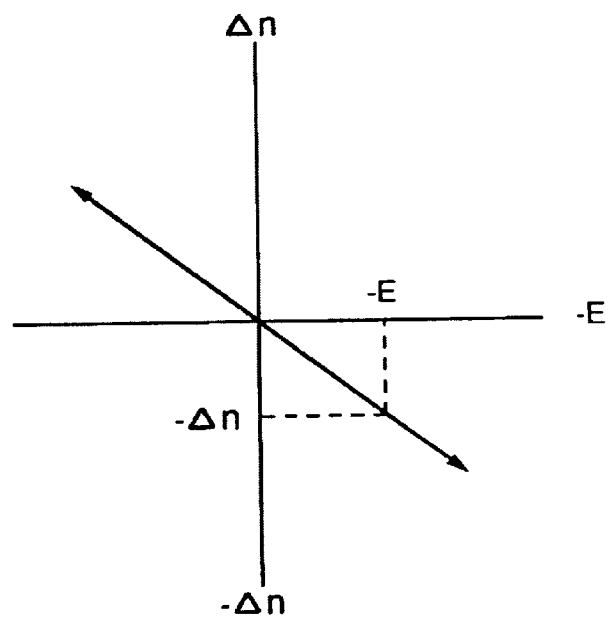

FIG. 1A and FIG. 1B are graphs illustrating linear electro-optic effects for different crystal axes of an electro-optic substrate. The linear electro-optic effect, referred to as the Pockels effect, is a property of an electro-optic substrate whereby refractive index changes ($\Delta n$) vary linearly with the magnitude and direction of an applied electric field (E). Depending on the crystal axis orientation of the substrate and the polarization of the optical signals, a linear electro-optic effect can be characterized with either a positive slope as in FIG. 1A or a negative slope as in FIG. 1B.

Figure 1C:
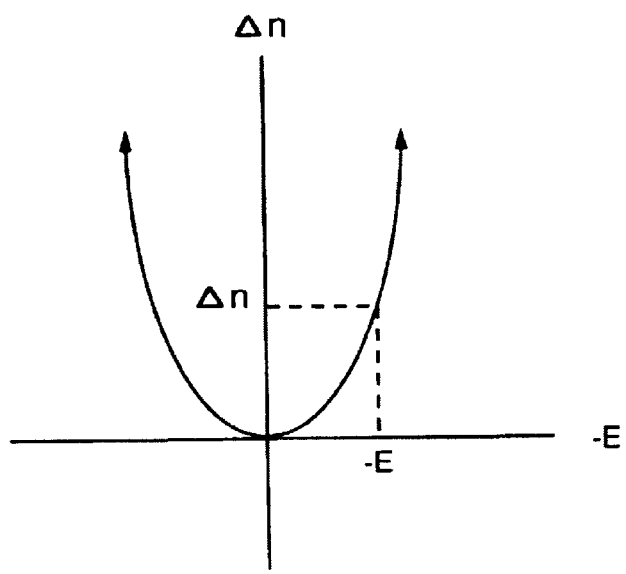
FIG. 1C is a graph illustrating the quadratic electro-optic effect of an electro-optic substrate.

FIG. 1C is a graph illustrating the quadratic electro-optic effect of an electro-optic substrate. The quadratic electro-optic effect, referred to as the Kerr effect, is a property typically associated with quantum well structures whereby refractive index changes ($\Delta n$) vary quadratically with the magnitude of an applied electric field (E). Thus, a refractive index change ($\Delta n$) for a given magnitude is the same regardless of the direction of the applied field. A quantum well structure is a heterostructure known to those skilled in the art, comprising alternating layers of quantum well and barrier layers. Such structures exhibit the quadratic electro-optic effect when an electric field is applied substantially perpendicular to them.

The present invention reduces the high switching voltage requirements for electro-optic push-pull modulators through combinations of device structure and operation, causing linear and quadratic electro-optic effects to add. With linear and quadratic effects adding together, significant refractive index changes can be realized with lower switching voltages, $V\pi$. Lower switching voltages facilitate push-pull modulator designs having smaller dimensions and lower power consumption requirements. In particular, the present invention induces linear and quadratic electro-optic effects to add through combinations of crystal axis orientation, waveguide structure, electrode structure, electric field biasing, operating wavelengths, and optical polarizations.

The present invention is applicable to electro-optic push-pull modulators having two phase modulators which need to be driven with index changes of opposite sign ("push-pull") and are built in a material with both linear and quadratic electro-optic effects. One such modulator type is a Mach-Zehnder interferometer having two parallel waveguides. The Mach-Zehnder interferometer is most efficiently driven when equal and opposite index changes are induced in these guides by a single modulating voltage. Although the Mach-Zehnder interferometer is provided as illustration, the present invention can be applied to multiple materials and modulator types.

Figure 2:
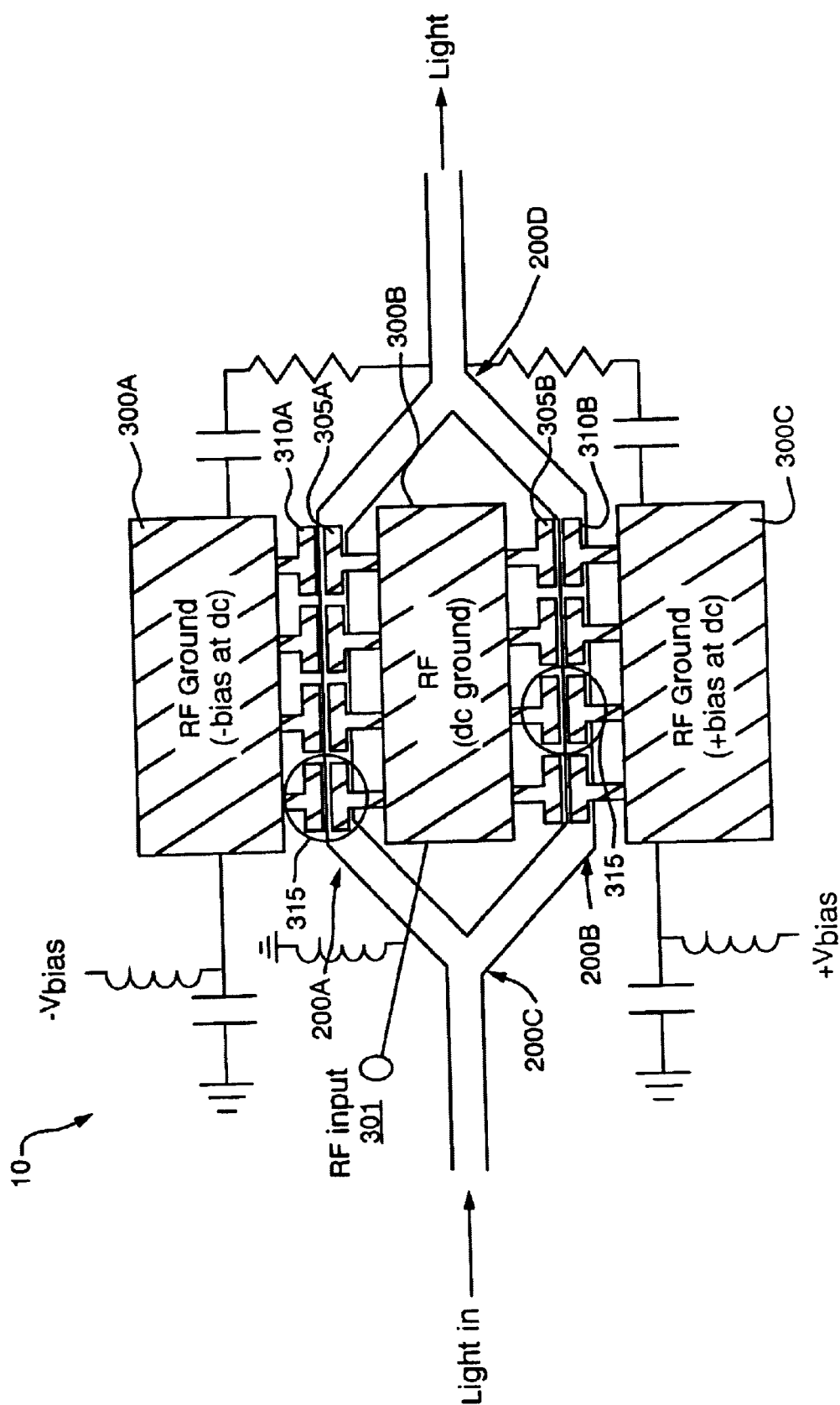
FIG. 2 is a schematic diagram illustrating a top view of a push-pull electro-optic modulator driven by linear and quadratic electro-optic effects.

FIG. 2 is a schematic diagram illustrating a top view of a push-pull electro-optic modulator driven by linear and quadratic electro-optic effects according to one embodiment. The modulator 10, arranged as a Mach-Zehnder interferometer, is fabricated in an electro-optic substrate, such as a III-V semiconductor. An optical waveguide 200 is defined in the substrate, branching into two parallel waveguide arms 200A, 200B for a distance and then merging together again. Optical signals originate from a light source, such as a laser, and propagate through the waveguide, splitting at the Y-branch 200C and recombining at the merge 200D.

An electrode structure 300 is disposed over the device applying electric fields across the waveguide arms 200A and 200B, referred to as the interaction distance, in order to induce equal and opposite refractive index changes for push-pull modulation. The index changes in both arms are controlled by a single, varying modulation voltage, Vm, applied to the RF input 301.

As optical signals propagate through the waveguide arms 200A, 200B, each arm independently modulates their phase. If the optical signals recombine at the merge 200D in phase, the optical signals effectively add together, emitting light from the modulator (i.e., "ON" state). If the optical signals recombine out of phase by 180 degrees, the optical signals effectively cancel each other out, resulting in the extinction of the light (i.e., "OFF" state). The switching voltage, $V\pi$, is the voltage swing of the modulation voltage, Vm, which induces a 180 degree phase differential between the waveguide arms.

Figure 3:
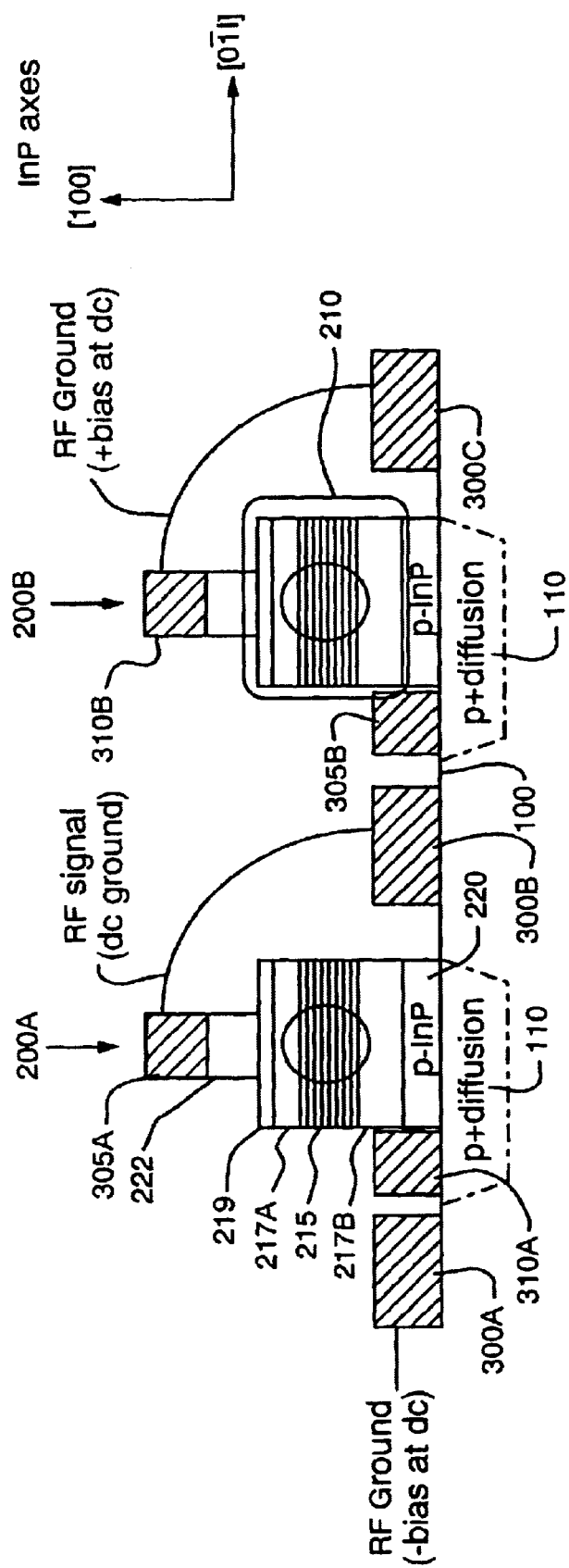
FIG. 3 is a diagram illustrating a cross sectional view of an electro-optic modulator driven by linear and quadratic electro-optic effects.

FIG. 3 is a diagram illustrating a cross sectional view of an electro-optic modulator driven by linear and quadratic electro-optic effects according to one embodiment. The electro-optic substrate 100 is a III-V semiconductor material, such as semi-insulating Indium Phosphide (InP), which exhibits a linear electro-optic effect when an electric field is applied to it. The crystal axis orientation of the substrate and the polarization of the optical signals are chosen such that the linear electro-optic effect of the substrate is characterized with either a positive or negative slope.

According to one embodiment, the linear effect is positively sloped for InP substrates, as in FIG. 1A, when an electric field is applied along the [100] crystal axis and the optical polarization is directed along the [0$\bar{1}$1] direction. According to another embodiment, the linear effect is negatively sloped for InP substrates, as in FIG. 1B, when an electric field is applied along the [100] crystal axis and the optical polarization is directed along the [011] direction.

To enable quadratic electro-optic effects, the waveguide 200 is fabricated in the substrate 100 as a P-I-N reverse-biased diode. In particular, the waveguide structure 200 has a Multiple Quantum Well (MQW) structure 210, which exhibits a quadratic electro-optic effect when an electric field is applied substantially perpendicular to it. The MQW structure 210 includes an active core region 215 surrounded by undoped cladding layers 217A and 217B. Optical signals propagate through the waveguide within the active core region 215, constrained vertically by the low refractive index of the cladding layers 217A, 217B and horizontally by the low refractive index of the air surrounding the ridged waveguide 200. Thus, optical losses due to free carrier absorption are maintained at a minimum.

According to one embodiment, the active core region 215 includes alternating layers of quantum well and barrier layers, such as intrinsic InGaAsP (Indium Gallium Arsenide Phosphide) and InP (Indium Phosphide), while the cladding layers 217A, 217B are fabricated with intrinsic InP (Indium Phosphide). An etch stop layer 219 may be grown to isolate the MQW structure 210 from doped layer 222. Other MQW structures known to those skilled in the art may also be utilized.

The MQW structure 210 is vertically coupled to doped layers 220 and 222, such as p-type InP and n-type InP, respectively. The doped layers 220 and 222 couple voltages from the electrode structure 300, applying electric fields substantially perpendicular to the MQW structure 210, resulting in refractive index changes (Δn) varying quadratically with the applied field as in FIG. 1C. Furthermore, since the MQW structure 210 is fabricated very thin, (e.g., 0.8 microns (μm) thick), a small voltage applied across each waveguide arm generates a high electric field per volt, providing further reduction in the required switching voltage.

To enhance the quadratic electro-optic effect in the MQW structure, the optical wavelength is chosen close enough to the absorption edge of the quantum well structure in order to induce a voltage-dependent optical absorption due to the Quantum-Confined Stark Effect (QCSE), but long enough to minimize optical losses. For InGaAsP/InP MQW structure, the absorption edge is approximately 1450 nanometers (nm). Thus, according to one embodiment, the operating wavelength of the optical signal is between 1500 and 1600 nanometers (nm), which is also the standard operating wavelength for long distance communications.

Because of the connection between absorption and the refractive index (i.e., Kramers-Kronig relations), a large electric field induced absorption change, such as QCSE, implies a strong quadratic electro-optic effect. This QCSE enhancement of the quadratic electro-optic effect coupled with the large refractive index of the semiconductor gives an index-change-per-field ($0.5n^3 r_{eff}$) that is almost as large as in lithium niobate.

Alternative embodiments of the waveguide structure may be implemented without an MQW structure, as long as the optical signals have an operating wavelength below the absorption edge of the substrate, inducing a quadratic electro-optic effect. For example, the waveguide structure may be implemented having Schottky contacts, or even an undoped structure, as long as a strong electric field is produced across the waveguide structure.

Figure 4A:
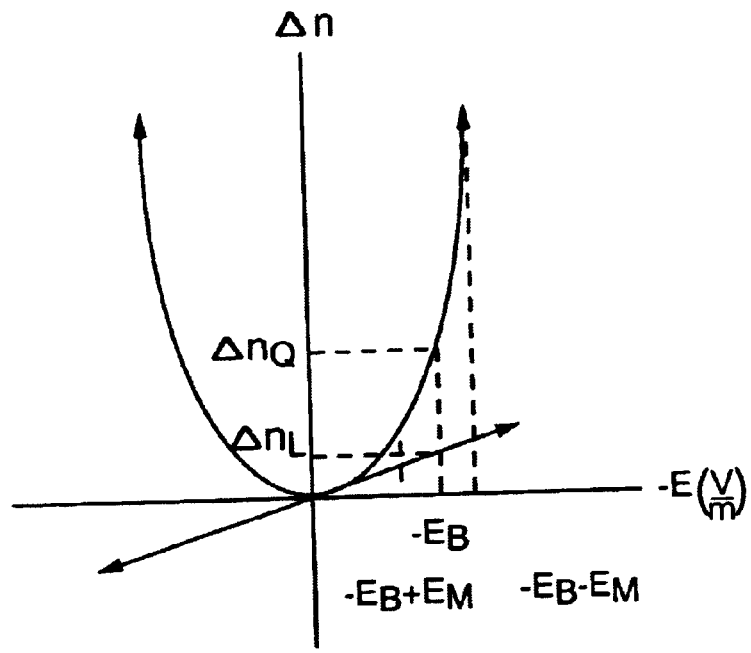
FIGS. 4A and 4B are graphs illustrating linear and quadratic electro-optic effects induced in waveguide structures.
Figure 4B:
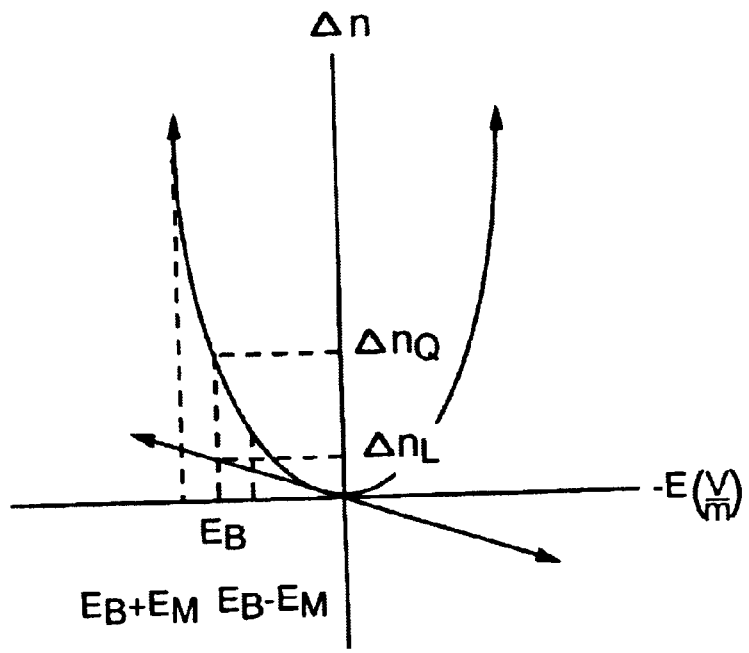

FIGS. 4A and 4B are graphs illustrating linear and quadratic electro-optic effects induced in waveguide structures according to embodiments of the invention. As shown, changes in refractive index (Δn) due to the linear electro-optic effect are dependent on the magnitude and direction of the applied field (E). In contrast, changes in refractive index (Δn) due to the quadratic electro-optic effect are dependent only on the magnitude of the applied field (E). (The negative electric field, −E, is plotted for convenience due to the use of the field direction along the negative [100] crystal axis.)

Therefore, in order to have both effects add together in each waveguide arm, electric fields must be applied substantially perpendicular to the waveguide arms in a direction such that both electro-optic effects respond with either positive or negative refractive index changes in response to an applied field. In other words, in response to an applied electric field, both electro-optic effects must operate in the same quadrant. Otherwise, the linear and quadratic effects will work against one another by subtracting, instead of adding, refractive index changes. Such results are obtained through combinations of electrode placement and electric field biasing.

Figure 5:
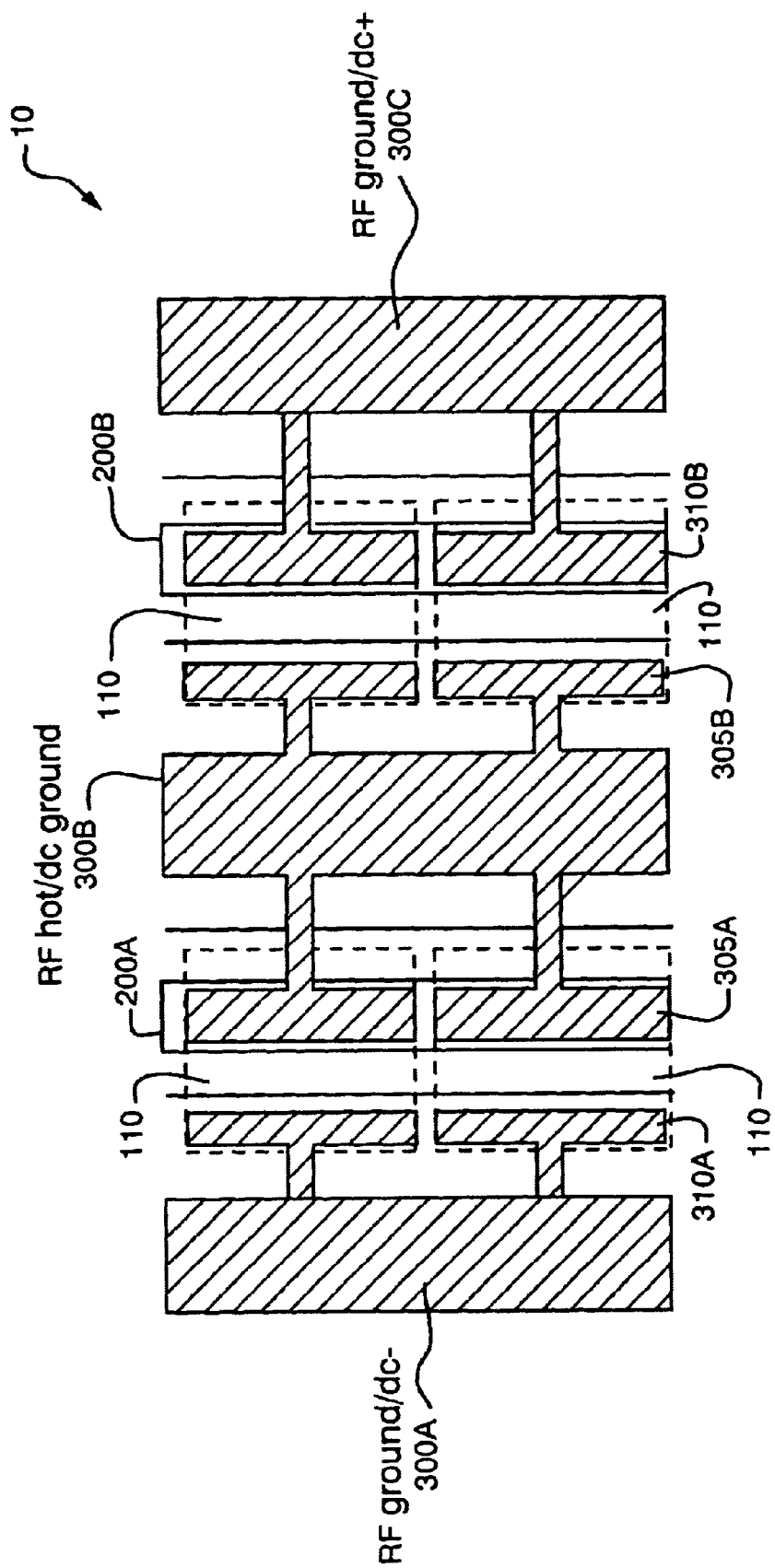
FIG. 5 is a diagram illustrating an electrode structure disposed about the substrate.

FIG. 5 is a diagram illustrating an electrode structure disposed about the substrate according to one embodiment. The electrode structure is a capacitively loaded coplanar waveguide (CPW) transmission line applying electric fields across the waveguide arms 200A, 200B. According to one embodiment, the electrode structure 300 includes an RF signal electrode 300B and two RF bias electrodes 300A and 300C. Microwave circuit considerations, however, often dictate that the bias electrodes 300A and 300C are grounded at high frequency. The electrodes 300A, 300B, and 300C are relatively large continuous conductors 300A, 300B, and 300C, resulting in low loss from metal resistance or the small regions of doped semiconductor 110 near the waveguides 200A and 200B.

Electric fields are applied to the waveguide arms 200A, 200B by loading capacitors 315, which are charged and discharged by the signal electrode 300B and ground electrodes 300A and 300C. According to one embodiment, the loading capacitors 315 are formed by spacing contact electrodes 305, 310, atop and adjacent to the base of the waveguide arms.

Highly doped regions 110, diffused into the substrate 100 prior to fabrication of the waveguide 200 and electrode 300 structures, provide for strong electrical-optical overlap by providing a path for coupling voltages from the contact electrodes 305, 310 adjacent to the bases of the waveguide arms 200A, 200B. According to one embodiment, the regions 110 are highly doped p+ regions.

For push-pull operation, connections are made between the contact electrodes 305, 310 and the signal and ground electrodes, such that a positive modulation voltage (Vm) on the signal electrode, adds to the electric field magnitude in one waveguide arm and subtracts from the electric field magnitude in the other waveguide arm.

Referring back to FIG. 3, one such embodiment connects the signal electrode 300B to the top contact electrodes 305A of arm 200A and the bottom contact electrodes 305B of arm 200B. The ground electrode 300A is connected to the bottom contact electrodes 310A of arm 200A, while the ground electrode 300C is connected to the top contact electrodes 310B of arm 200B. Thus, a small positive signal voltage (Vm) adds to the electric field in the waveguide 200A and subtracts from the electric field in waveguide 200B. The net effect is that the modulating voltage (Vm) strengthens the field across one arm, while weakening the field across the other. Other electrode configurations may also be utilized to invoke such push-pull operation.

Furthermore, the electrode structure 300 is biased at the ground electrodes 300A, 300C with opposite DC voltage polarities, such that an electric field is biased across each waveguide arm 200A, 200B. The bias voltages are applied to the ground electrodes, such that the electric fields are biased in a direction that induces the electro-optic effects to add in each arm. Thus, with the application of the bias field, an initial refractive index change is induced in each waveguide arm 200A, 200B, cumulative of the individual refractive index changes from both the linear and quadratic effects having the same sign.

For example, with the waveguide arms 200A, 200B characterized by the electro-optic effects in FIG. 4A, a negative bias field is directed toward the substrate in order to induce cumulative refractive index changes by both effects. Thus, the ground electrode 300A is biased with a negative DC voltage, while ground electrode 300C is biased with a positive DC voltage, resulting in a bias field ($E_B$) applied along the negative-[100] direction toward the substrate in both waveguide arms 200A, 200B. The bias field ($E_B$) in each waveguide arm 200A, 200B induces a default cumulative refractive index change (i.e., $\Delta n_L + \Delta n_Q$) from both effects.

According to another embodiment, when the waveguide arms 200A, 200B are characterized by the electro-optic effects in FIG. 4B, a positive bias field is directed away from the substrate in order to induce cumulative refractive index changes by both effects. Thus, the ground electrode 300A is biased with a positive DC voltage, while ground electrode 300C is biased with a negative DC voltage, resulting in a bias field ($E_B$) applied along the positive-[100] direction away from the substrate in both waveguide arms 200A, 200B. The bias field ($E_B$) in each waveguide arm 200A, 200B induces a default cumulative refractive index change (i.e., $\Delta n_L + \Delta n_Q$) from both effects. In either embodiment, the bias field is typically less than or equal to one-half the breakdown field of the waveguide structure in order to minimize optical losses.

In normal operation, when a modulation signal voltage, Vm, is applied to the center signal electrode 300B, the modulation signal voltage, which is relatively small in comparison to the DC bias voltages, subtracts from the bias voltage in one arm and adds to the bias voltage in the other. Referring to FIG. 4A, the net effect is that the modulating voltage strengthens the field across one arm ($-E_B - E_M$), while weakening the field across the other ($-E_B + E_M$). Referring to FIG. 4B, the net effect is that the modulating voltage strengthens the field across one arm ($E_B + E_M$), while weakening the field across the other ($E_B - E_M$). Since the index change is proportional to the field magnitude in both guides 200 and for both effects, this produces the desired push-pull modulation. This is a frequency-independent effect for both effects, even down to DC.

Embodiments of the invention, as described above with respect to FIGS. 2, 3, 4A, and 5, enable low voltage modulators at high speeds such that modulators could be driven directly from logic levels (e.g., 800 mV at 10 Gbit/s). One particular embodiment includes a 1-cm long modulator, which is expected to have a 3 dB bandwidth of DC to 50 GHz, with a Vπ of 0.5 volts at 50 GHz. Such a modulator would have 8 dB of fiber-to-fiber optical loss at its operating wavelength of 1550 nanometers (nm) and an impedance of 25 ohms (Ω). For low frequency applications where microwave velocity matching is not required, a similar 1-cm-long modulator would have a Vπ at DC of only 0.25 volts (V), an impedance of 45 ohms, and a bandwidth of dc to 7 Ghz.

The interaction strength of an electro-optic modulator is typically characterized by a "VL product," which is the product of the switching voltage (Vπ) multiplied by the interaction distance (L). This interaction strength is generally a constant. For example, the VL product for lithium niobate (LbNO$_3$) is typically 55 volts per millimeter (V-mm) at operating wavelengths of 1550 nanometers (nm). Thus, in order to reduce switching voltage, the interaction length must increase to compensate.

Embodiments of the invention provide a VL product (Vπ0 multiplied by electrode length) of approximately 2.5 V-mm at 1550 nm, which is 25 times lower than for lithium niobate. For applications where the modulator length is limited, this translates directly to a 25 times reduction in Vπ. For single high-frequency modulators, the length is limited by microwave and optical losses and by available substrate size; thereby a smaller improvement will be realized.

The restriction of velocity matching does require some compromises in design. The line impedance of the electrode structure could be left near 50 ohms (Ω), but this would require such short loading sections (i.e., small fill factor along the waveguide length) that the Vπ would be more than doubled. A more optimum choice is to use a fill factor of 0.72, so Vπ only goes up by 1.4 times to 0.35 V with the impedance dropping to 25 ohms (Ω). With the 3-dB rolloff in modulation response expected from the electrode loss at 50 GHz, this gives a Vπ at 50 GHz of 0.5 V. For comparison, the effective Vπ referenced back to a 50 ohm environment, which counts the total effect on drive power of both Vπ and modulator impedance for the modulator just described, is 0.5 V up to about 20 GHz, then it rises to 0.7 V by 50 Ghz.

The optical loss is kept low (4 dB/cm) by operating at a wavelength 50–60 meV below the exciton absorption peak. The tolerance on operating wavelength is actually looser than that required for commercial DWDM systems. The tiny waveguides can be widened up to 3 microns ($\mu$m) in the transverse dimension by an adiabatic taper, resulting in 2 dB of fiber-to-waveguide loss coupling a standard fiber to 3×0.5-$\mu$m semiconductor waveguides. With waveguide bends and branches (or couplers) designed for very low loss, this gives an estimated fiber-to-fiber optical loss of 8 dB.

Figure 6A:
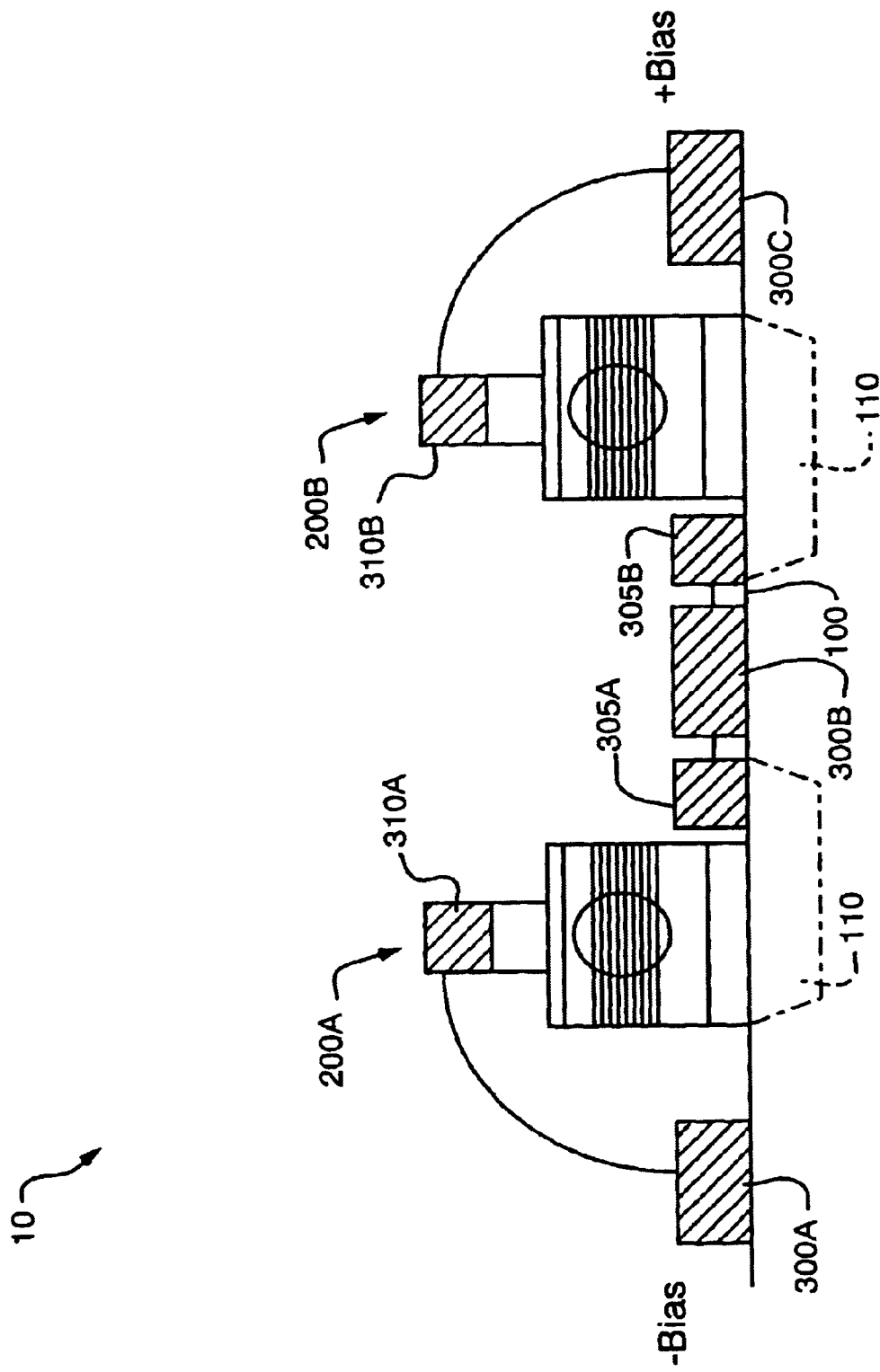
FIG. 6A is a schematic diagram illustrating a cross-section of a push-pull modulator.

FIG. 6A is a schematic diagram illustrating a cross-section of a push-pull modulator according to a further embodiment. The push-pull modulator has the same basic structure as those described previously, but with modifications to the electrode structure 300 and device operation. Such modifications result in push-pull modulators driven solely by the quadratic electro-optic effect.

According to one embodiment, both ground electrodes 300A and 300C are connected to the contact electrodes atop the waveguide arms 200A, 200B, while the signal electrode 300B is connected to the contact electrodes adjacent to the waveguide arms. The ground electrodes 300A and 300C are biased with opposite DC bias voltages. This electrode placement results in bias fields applied across each waveguide arm having the same magnitude but different directions. One waveguide arm has a bias field applied in the positive-[100] direction, while the other waveguide arm has a bias field applied in the negative-[100] direction.

The electric field and the optical polarization are selected to avoid any linear electro-optic effect. According to one embodiment, the linear electro-optic effect is avoided by an electric field applied along the [100] crystal axis and an optical polarization defined along the [100] crystal axis.

Figure 6B:
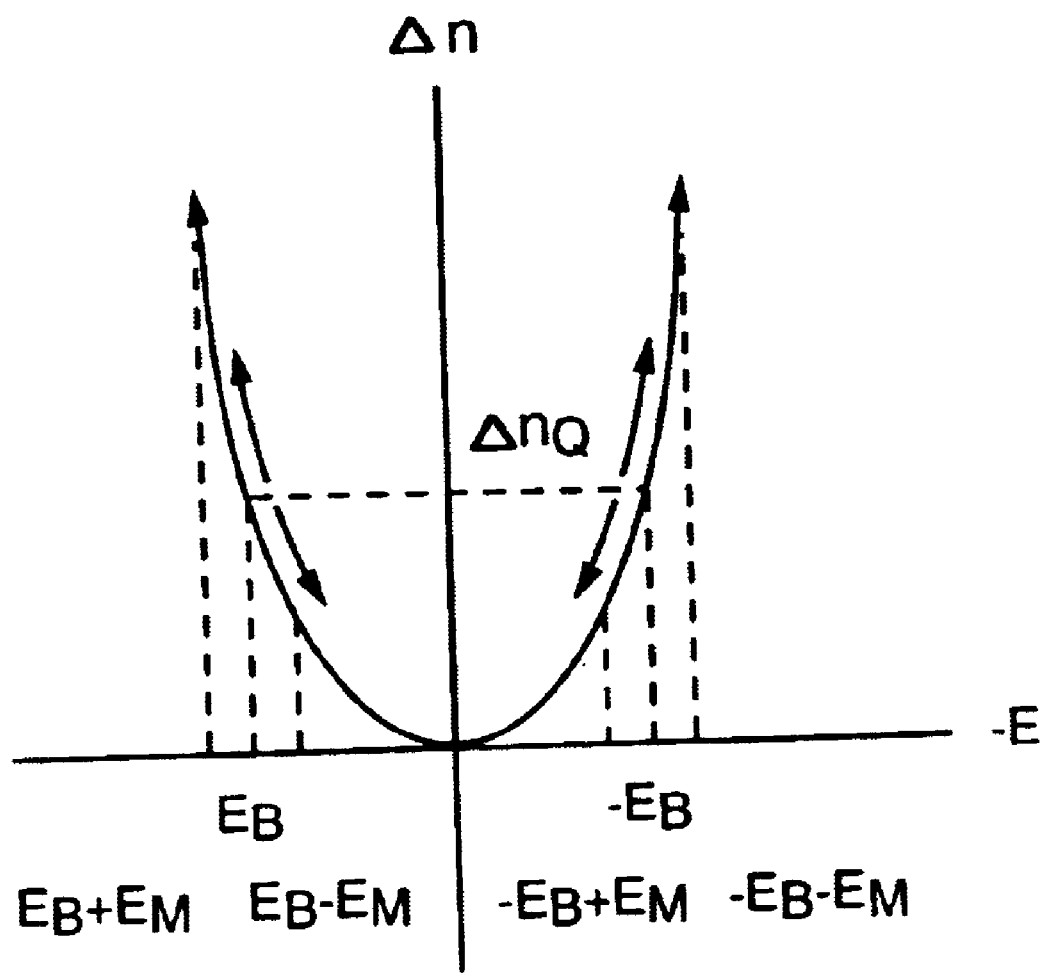
FIG. 6B is a graph illustrating the quadratic electro-optic effect in the waveguide structure.

FIG. 6B is a graph illustrating the electro-optic effects in the waveguide structure according to the embodiment of FIG. 6A. As illustrated, the push-pull modulator described with reference to FIG. 6A exhibits a quadratic electro-optic effect in each waveguide arm. When a positive modulation voltage is applied to the center electrode, the electric field is weakened in one arm and strengthened in the other. Since the effects are roughly proportional, the refractive index changes are also roughly equal and opposite, thus, providing push-pull operation.

While this invention has been particularly shown and described with references to preferred embodiments thereof, it will be understood by those skilled in the art that various changes in form and details may be made therein without departing from the scope of the invention.

What is claimed is:

1. An electro-optic push-pull modulator, comprising:
   a substrate;
   an electro-optic waveguide having a multiple quantum well (MQW) structure defined about the substrate, the waveguide having a crystal axis orientation, the waveguide having a first waveguide arm and a second waveguide arm, optical signals propagating through the waveguide, the optical signals having an optical polarization;
   each waveguide arm exhibiting refractive index changes, which vary quadratically in response to varying electrical fields applied to the waveguide arms substantially perpendicular to the MQW structure;
   each waveguide arm exhibiting further refractive index changes, which vary linearly in response to the varying electrical fields, the linear response determined by the crystal axis orientation of the waveguide and the optical polarization of the optical signals; and
   an electrode structure disposed about the substrate applying the varying electrical fields to each waveguide arm substantially perpendicular to the MQW structure, the electrode structure inducing opposite refractive index changes in the waveguide arms with an applied modulation voltage for push-pull modulation of the optical signals, the electrode structure biasing the electrical fields about an electrical field having a non-zero magnitude and a direction such that the linearly-varying and quadratically-varying refractive index changes add together.

2. The electro-optic push-pull modulator of claim 1, wherein the electrode structure comprises:
   a signal electrode and biasing electrodes;
   bias voltages applied to the biasing electrodes, such that one biasing electrode has a bias voltage higher than voltages applied to the signal electrode and another biasing electrode has a bias voltage lower than the voltages applied to the signal electrode.

3. The electro-optic push-pull modulator of claim 2, wherein the electrode structure comprises:
   a first biasing electrode applying a positive bias voltage to the top of the first waveguide arm for biasing an electrical field with a non-zero magnitude, the electrical field directed toward the substrate substantially perpendicular to the multiple quantum well structure of the first waveguide arm;
   a second biasing electrode applying a negative bias voltage to the base of the second waveguide arm for biasing an electrical field with a non-zero magnitude, the electrical field directed toward the substrate substantially perpendicular to the multiple quantum well structure of the second waveguide arm; and
   a signal electrode, the signal electrode applying the modulation voltage to the base of the first waveguide arm, the signal electrode applying the modulation signal voltage to the top of the second waveguide arm.

4. The electro-optic modulator of claim 3, wherein the optical polarization is directed along the $[0\bar{1}1]$ direction and an electric field is applied along the negative-[100] crystal axis of the waveguide structure.

5. The electro-optic push-pull modulator of claim 2, wherein the electrode structure comprises:
   a first biasing electrode applying a negative bias voltage to the top of the first waveguide arm for biasing an electrical field with a non-zero magnitude, the electrical field directed away from the substrate substantially perpendicular to the multiple quantum well structure of the first waveguide arm;
   a second biasing electrode applying a positive bias voltage to the base of the second waveguide arm for biasing an electrical field with a non-zero magnitude, the electrical field directed away from the substrate substantially perpendicular to the multiple quantum well structure of the second waveguide arm; and
   a signal electrode, the signal electrode applying the modulation voltage to the base of the first waveguide arm, the signal electrode applying the modulation signal voltage to the top of the second waveguide arm.

6. The electro-optic modulator of claim 5, wherein the optical polarization is directed along the [011] direction and an electric field is applied along the positive-[100] crystal axis of the waveguide structure.

7. The electro-optic modulator of claim 1, wherein the optical signals have an operating wavelength below the absorption edge of the substrate, inducing greater quadratically-varying refractive index changes.

8. The electro-optic modulator of claim 7, wherein the optical signals have an operating wavelength between 1550 and 1600 nanometers.

9. The electro-optic modulator of claim 1, wherein the substrate is a III-V semiconductor.

10. An electro-optic push-pull modulator, comprising:
    a substrate;
    an electro-optic waveguide having a multiple quantum well (MQW) structure defined about the substrate, the waveguide having a first waveguide arm and a second waveguide arm, optical signals propagating through the waveguide, the optical signals having an optical polarization;
    each waveguide arm exhibiting refractive index changes, which vary quadratically in response to varying electrical fields applied to the waveguide arms substantially perpendicular to the MQW structure; and
    an electrode structure disposed about the substrate applying the varying electrical fields to each waveguide arm substantially perpendicular to the MQW structure, the electrode structure inducing opposite refractive index changes in the waveguide arms with an applied modulation voltage for push-pull modulation of the optical signals, the electrode structure biasing the electrical fields about an electrical field having a non-zero magnitude and a direction resulting in greater refractive index changes.

11. The electro-optic modulator of claim 10, wherein the electrode structure applies varying electrical fields in the same direction in each waveguide arm.

12. The electro-optic modulator of claim 11, wherein the electrode structure comprises:
    a first biasing electrode applying a positive bias voltage to the top of the first waveguide arm for biasing an electrical field with a non-zero magnitude, the electrical field directed toward the substrate substantially perpendicular to the MQW structure of the first waveguide arm;
    a second biasing electrode applying a negative bias voltage to the base of the second waveguide arm for biasing an electrical field with a non-zero magnitude, the electrical field directed toward the substrate substantially perpendicular to the MQW structure of the second waveguide arm; and a signal electrode applying a modulation signal voltage to the base of the first waveguide arm, the signal electrode applying the modulation signal voltage to the top of the second waveguide arm.

13. The electro-optic modulator of claim 11, wherein the electrode structure comprises:
a first biasing electrode applying a negative bias voltage to the top of the first waveguide arm for biasing an electrical field with a non-zero magnitude, the electrical field directed away from the substrate substantially perpendicular to the MQW structure of the first waveguide arm;
a second biasing electrode applying a positive bias voltage to the base of the second waveguide arm for biasing an electrical field with a non-zero magnitude, the electrical field directed away from the substrate substantially perpendicular to the MQW structure of the second waveguide arm; and
a signal electrode applying a modulation signal voltage to the base of the first waveguide arm, the signal electrode applying the modulation signal voltage to the top of the second waveguide arm.

14. The electro-optic modulator of claim 10, wherein the electrode structure applies varying electrical fields in the opposite directions in each waveguide arm.

15. The electro-optic modulator of claim 14, wherein the electrode structure comprises:
a first biasing electrode applying a positive bias voltage to the top of the first waveguide arm for biasing an electrical field with a non-zero magnitude, the electrical field directed toward the substrate substantially perpendicular to the multiple quantum well structure of the first waveguide arm;
a second biasing electrode applying a negative bias voltage to the top of the second waveguide arm for biasing an electrical field with a non-zero magnitude, the electrical field directed away from the substrate substantially perpendicular to the multiple quantum well structure of the second waveguide arm; and
a signal electrode applying a modulation signal voltage to the base of the first waveguide arm, the signal electrode applying the modulation signal voltage to the base of the second waveguide arm.

16. The electro-optic modulator of claim 14, wherein the electrode structure comprises:
a first biasing electrode applying a negative bias voltage to the top of the first waveguide arm for biasing an electrical field with a non-zero magnitude, the electrical field directed away from the substrate substantially perpendicular to the multiple quantum well structure of the first waveguide arm;
a second biasing electrode applying a positive bias voltage to the top of the second waveguide arm for biasing an electrical field with a non-zero magnitude, the electrical field directed toward the substrate substantially perpendicular to the multiple quantum well structure of the second waveguide arm; and
a signal electrode applying a modulation signal voltage to the base of the first waveguide arm, the signal electrode applying the modulation signal voltage to the base of the second waveguide arm.

17. The electro-optic modulator of claim 10, wherein the optical signals have an operating wavelength below the absorption edge of the substrate, inducing greater quadratically-varying refractive index changes.

18. The electro-optic modulator of claim 16, wherein the optical signals are operated at a wavelength between 1550 and 1600 nanometers.

19. An electro-optic push-pull modulator, comprising:
a substrate;
an electro-optic waveguide having a multiple quantum well (MQW) structure defined about the substrate, the waveguide having a crystal axis orientation, the waveguide having a first waveguide arm and a second waveguide arm, optical signals propagating through the waveguide, the optical signals having an optical polarization;
each waveguide arm exhibiting refractive index changes, which vary quadratically in response to varying electrical fields applied to the waveguide arms substantially perpendicular to the MQW structure;
each waveguide arm exhibiting further refractive index changes, which vary linearly in response to the varying electrical fields applied to the waveguide arms substantially perpendicular to the MQW structure, the linear response determined by the crystal axis orientation of the waveguide and the optical polarization of the optical signals; and
means for applying the varying electrical fields to each waveguide arm substantially perpendicular to the MQW structure, means for inducing opposite refractive index changes in the waveguide arms with an applied modulation voltage for push-pull modulation of the optical signals, means for biasing the electrical fields about an electrical field having a non-zero magnitude and a direction such that the linearly-varying and quadratically-varying refractive index changes add together.

20. An electro-optic push-pull modulator, comprising:
a substrate;
an electro-optic waveguide having a multiple quantum well (MQW) structure defined about the substrate, the waveguide having a first waveguide arm and a second waveguide arm, optical signals propagating through the waveguide having an optical polarization;
each waveguide arm exhibiting refractive index changes, which vary quadratically in response to varying electrical fields applied to the waveguide arms substantially perpendicular to the MQW structure; and
means for applying the varying electrical fields to each waveguide arm substantially perpendicular to the MQW structure, means for inducing opposite refractive index changes in the waveguide arms with an applied modulation voltage for push-pull modulation of the optical signals, means for biasing the electrical fields about an electrical field having a non-zero magnitude and a direction resulting in greater refractive index changes.

21. An electro-optic push-pull modulator, comprising:
a substrate;
an electro-optic waveguide defined about the substrate, the waveguide having a crystal axis orientation, the waveguide having a first waveguide arm and a second waveguide arm, optical signals propagating through the waveguide, the optical signals having an optical polarization;
each waveguide arm exhibiting refractive index changes, which vary quadratically in response to varying electrical fields applied to the waveguide arms and the optical signals have an operating wavelength below the absorption edge of the substrate;
each waveguide arm exhibiting further refractive index changes, which vary linearly in response to the varying electrical fields applied to the waveguide arms, the linear response determined by the crystal axis orientation of the waveguide and the optical polarization of the optical signals; and an electrode structure disposed about the substrate applying the varying electrical fields to each waveguide arm, the electrode structure inducing opposite refractive index changes in the waveguide arms with an applied modulation voltage for push-pull modulation of the optical signals, the electrode structure biasing the electrical fields about an electrical field having a non-zero magnitude and a direction such that the linearly-varying and quadratically-varying refractive index changes add together.

22. An electro-optic push-pull modulator, comprising:

a substrate;

an electro-optic waveguide defined about the substrate, the waveguide having a first waveguide arm and a second waveguide arm, optical signals propagating through the waveguide, the optical signals having an optical polarization;

each waveguide arm exhibiting refractive index changes, which vary quadratically in response to varying electrical fields applied to the waveguide arms and the optical signals have an operating wavelength below the absorption edge of the substrate; and an electrode structure disposed about the substrate applying the varying electrical fields to each waveguide arm, the electrode structure inducing opposite refractive index changes in the waveguide arms with an applied modulation voltage for push-pull modulation of the optical signals, the electrode structure biasing the electrical fields about an electrical field having a non-zero magnitude and a direction resulting in greater refractive index changes.

* * * * *